United States Patent

Boling

[15] 3,638,632
[45] Feb. 1, 1972

[54] MOTORCYCLE COMPRESSION RELEASE

[72] Inventor: James Willard Boling, 2060 Almanor St., Oxnard, Calif. 93030

[22] Filed: May 6, 1970

[21] Appl. No.: 35,058

[52] U.S. Cl. .......................................... 123/182, 123/97 B
[51] Int. Cl. ........................................ F01l 13/06, F01l 13/08
[58] Field of Search ........................................ 123/182, 97 B

[56] References Cited

UNITED STATES PATENTS

| 714,902   | 12/1902 | Hinchley ........................... 123/182   |
| 1,254,104 | 1/1918  | Wygodsky ........................... 123/182   |
| 1,579,985 | 4/1926  | Wheeler ........................... 123/182 X  |
| 1,161,417 | 11/1915 | Schwerdtfeger ................... 123/182 X    |
| 2,011,123 | 8/1935  | Shilson et al. ....................... 123/182 X |
| 2,092,175 | 9/1937  | Loeffler ........................... 123/182 X |
| 2,625,924 | 1/1953  | Friedlob ........................... 123/182   |
| 2,742,380 | 4/1956  | Peters ........................... 123/182     |

OTHER PUBLICATIONS

Hemmer, J., Compression Release for Two-Stroke Engine Braking, in Cycle Magazine, Sept. 1968, pp. 73–75.
Thomas, Smoke, A Better Stop, in Cycle Guide Magazine, Aug. 1970, pp. 31–33 and 82–83.

*Primary Examiner*—Al Lawrence Smith
*Attorney*—Pastoriza & Kelly

[57] ABSTRACT

A compression release structure for a motorcycle includes the customary exit valve communicating with the combustion cylinder interior and may be lifted from its seat by manual operation of a pull cable in order to expel combustion product and gases under compression from the cylinder. When the cylinder pressure is diminished to a point where ambient air would otherwise tend to enter the cylinder with its contaminants the air is prevented from entering and fouling the cylinder and lubricants by a spring-biased one-way check valve.

The one-way check valve is self-centering and of conical shape to swiftly establish a positive seal with its seat and block out the atmospheric air.

10 Claims, 3 Drawing Figures

PATENTED FEB 1 1972
3,638,632
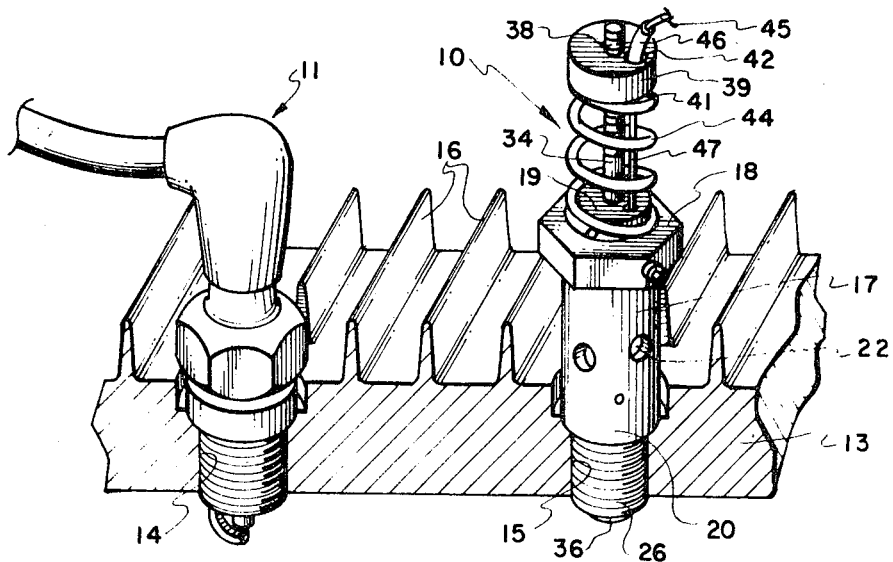
FIG. 1
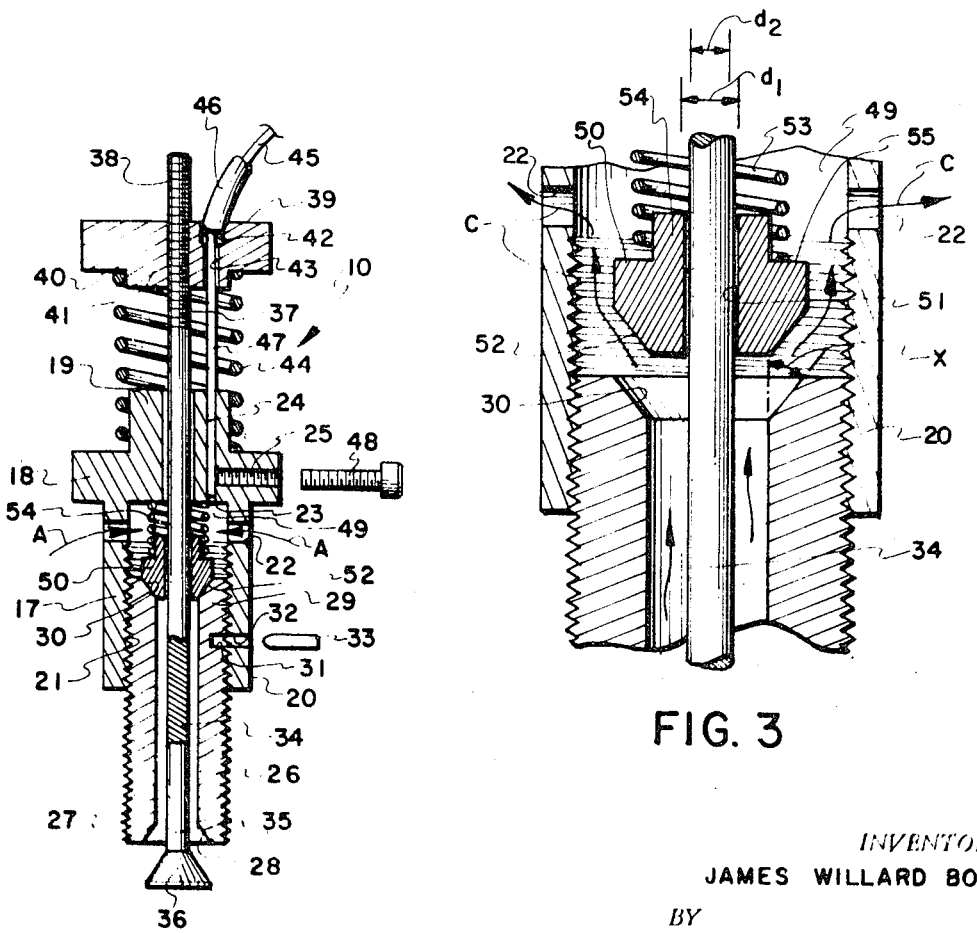
FIG. 2
FIG. 3
INVENTOR:
JAMES WILLARD BOLING
BY
Pastoriza & Kelly
ATTORNEYS

MOTORCYCLE COMPRESSION RELEASE

BACKGROUND OF THE INVENTION

This invention relates to compression releases for combustion cylinders and more specifically to a valve arrangement for a motorcycle compression release structure.

It is customary to employ compression release structures in motorcycle engines with two-stroke-type power cylinders in order to vent combustion product and other gases in the cylinder to the atmosphere. The compression may be diminished to a level where the engine is reduced to a very low power level or shut off so that the driving force is curtailed or is terminated. The ability to release highly pressurized hot gases to slow down or shut off the engine allows as a braking action to take effect that is very beneficial under certain emergency and instability conditions.

Ordinarily, motorcycles with compression release structures include a hand-operated lever near the right handlebar for operating the front wheel brakes, a foot pedal for operating the rear wheel brakes and another hand lever near the left handlebar for actuating the compression release structure. If the motorcycle is being negotiated down a precipitous or precarious descent where there is poor traction the driver must spread his legs outwardly to steady the motorcycle with both feet and so it is impossible for him to operate the rear wheel brakes. The inability to take advantage of the rear wheel braking force when it is most needed makes it difficult to minimize the danger. The same inability to operate the rear wheel brakes arises when the driver must use both feet to stabilize the vehicle traveling over jouncy, "wash pan" type level ground. During these times of danger or discomfort extra or auxiliary braking action can be realized by operating the compression release to achieve a compression braking force.

When the compression release structure is actuated to open the main valve communicating with the cylinder the combustion product rushes outwardly to the atmosphere and the concomitant diminished pressure soon develops into a partial vacuum, which draws atmospheric air into the cylinder so long as the main valve remains open. The airstream from the surrounding atmosphere carries dirt, dust, pollutants, and various other particles into the cylinder which causes such adverse effects as diminishing combustion efficiency and mechanical erosion. When the air mingles with the oil it becomes difficult to satisfactorily lubricate such components as the cylinder walls and piston.

As shall be fully explained one of the important features of this invention comprehends locating a spring-biased one-way check valve in the compression release structure to quickly, positively and effectively block out all atmospheric air that otherwise would travel in a reverse path through the main valve and into the cylinder.

SUMMARY OF THE INVENTION

This invention comprehends a motorcycle compression release structure for quickly exhausting highly compressed combustion product to slow down or shut off the engine for purposes of accomplishing an auxiliary braking effect, and, at the same time preventing atmospheric air from being sucked into the cylinder.

The motor compression release structure has a housing formed with an internal bearing shoulder and a central bore that extends from the upper end to the lower end of the housing. An externally threaded tubular insert is threadably coupled to an internally threaded portion of the housing which holds the insert in a position so that its lower end projects outwardly from the housing lower end and its upper end remains confined in the housing in a position spaced from the housing shoulder. The lower end of the insert defines a first valve seat and the upper end of the insert defines a second valve seat which is of round configuration.

An elongated rod extends centrally through the housing and tubular insert and is integrally formed at its lower end with a first valve that mates with the first valve seat. The rod upper end projects through the housing upper end for adjustable connection with a retaining cap which may be a nut. A first coil spring has opposing ends in engaging the retaining member and the housing and operates to normally bias the first valve onto its seat so that under ordinary conditions combustion product in the motorcycle cylinder is prevented from escaping to the atmosphere.

A second valve, preferably of conical shape to mate with the second valve seat is arranged to be self-centering and make a tight seal with its seat. Preferably the angle defined by the second valve longitudinal center line and its conical sidewalls is between 20° and 35°. A second spring associated with the second valve has opposing ends engaging the second valve and the housing internal shoulder and its biasing force operates to normally close the second valve which operates as a one-way check valve.

A first guide opening extends longitudinally through the retaining cap and registers with a second guide opening force in the housing. A pull cable is tightened in the second guide opening and terminates in a conventional hand lever near one of the the motorcycle handlebars.

When auxiliary braking force is desired the motorcycle driver squeezes or otherwise manipulates the handlebar lever to actuate the pull cable whose action in turn opens the first valve. The highly compressed hot combustion product and other gases then: flow through the first valve; overcome the resistance of the second spring to lift the second valve from its seat; and, flow through the second valve and outwardly to the atmosphere through ports in the housing. When the cylinder pressure is diminished to a predetermined level the spring pressure of the second spring overcomes the resulting pressure and forces the second valve back onto its seat. Being conically shaped and slightly spaced around the rod, the second valve with a self-centering action becomes thrust into tight sealing engagement with its seat in order to block out external air that otherwise would flow in a reverse path through the first valve and into the cylinder.

BRIEF DESCRIPTION OF THE DRAWINGS

The numerous benefits and unique aspects of the present invention will be fully understood when the following detailed description is studied in conjunction with the drawings in which:

FIG. 1 is a perspective sectional view showing the compression release structure and a spark plug installed in a motorcycle cylinder wall;

FIG. 2 is a partially exploded longitudinal sectional view through the compression release structure; and, FIG. 3 is a fragmentary sectional view of an interior portion including the one-way check valve of the compression release structure.

DETAILED DESCRIPTION OF THE PREFERRED EMBODIMENT

Referring now to FIG. 1 and FIG. 2 a compression release structure 10 constructed in accordance with this invention and a conventional spark plug 11 are shown installed for use within a wall 13 of a combustion cylinder embodied in a conventional two-stroke-type motorcycle engine One tapped opening 14 and another tapped opening 15 threadably interengage sections of spark plug 11 and compression release structure 10 respectively. The cylinder is integrally formed with a series of external cooling fins 16.

The compression release structure 10 incorporates a centrally located and generally annular housing 17 with an upper end 18 terminating in an hexagonal head and upstanding boss 19. Extending centrally through housing 17 between its upper end 18 and lower end 20 is a bore 21 having an internally threaded portion in lower end 20. A plurality of radial ports 22 extend outwardly from bore 21 through the annular wall of housing 17. An internal annular shoulder 23 is integrally formed above the ports 22. A vertical guide opening 24 whose function will subsequently be described is located in upper end 18 and intersects a laterally extending locking opening 25.

A tubular insert 26 with external threads is screwed into and projects from housing lower end 20. Tubular insert 26 has a lower end 27 that is shaped to form a valve seat 28 and has an upper end 29 which is recessed and shaped to form a valve seat 30 of round configuration that is preferably conical. A laterally aligned opening 31 extending partially through insert 26 registers with an opening 32 extending completely through housing 17 so that a connecting pin 33 may be used to prevent relative rotation between housing 17 and insert 26.

A series of partial openings similar to opening 31 may be arranged at different longitudinal levels along insert 26 so that the depth to which compression release structure 10 may be inserted into the cylinder wall may be adjusted to accommodate changing needs for different cylinders.

Arranged through the center of housing 17 and tubular insert 26 is an elongated rod 34 with a lower end 35 defining a valve 36 shaped to mate with valve seat 28. The upper end 37 of rod 24 has a threaded portion 38 for interengaging an internally threaded retaining cap 39. Retaining cap 39 has an annular bearing section 40 and a depending box 41. An enlarged socket 42 is formed in the top wall of cap 39 and a guide opening 43 extends entirely through cap 39 and is aligned in registering relationship with guide opening 24 in housing 17.

The upper and lower ends of a compressed coil spring 44 fit over boss 41 and boss 19 respectively. The biasing force of spring 44 operates to spread cap 39 and housing 17 apart from one another in order to normally hold valve 36 in its closed condition.

A pull cable 45 is linked in the customary manner to a manually operable lever near one of the motorcycle handlebars (not shown) so that when the driver so desires he may squeeze or otherwise manipulate the lever and thereby cause cable 45 to open valve 36. When this action occurs the combustion product and other gases become discharged from the cylinder into the atmosphere through the compression release structure 10 as shall be more fully described. Enclosing cable 45 is a casing 46 whose base end fits snugly in socket 42. The cable 45 is positioned in guide opening 43 and guide opening 24 to a sufficient depth so that its end 47 can be firmly locked against housing 17 by a tightening element 48 held in locking opening 25. Because cable end 47 is arranged inside of coil spring 44 rather than outside as is customary, it is neatly and conveniently packaged and minimizes the possibility of becoming entangled or caught in some object.

Referring primarily to FIG. 3 but also to FIG. 2 a chamber 49 defined between housing 17 and insert 26 encloses a one-way check valve 50 having an end to end central opening 51 of diameter $d_1$ which is slightly larger than the diameter $d_2$ of elongated rod 24 (shown exaggerated for purposes of illustration). The sealing portion of valve 50 is characterized by conical wall 52 shaped to mate and make tight sealing engagement with valve seat 30. Valve opening diameter $d_1$ is sufficiently larger than rod diameter $d_2$ so that valve 50 may be slid along rod 34, but the resulting annular gap is sufficiently narrow so that virtually no air can enter the cylinder from the atmosphere under conditions that will be fully explained. Valve 50 is normally held on its valve seat 30 by a compressed coil spring whose upper end engages housing internal shoulder 23 and whose lower end fits around a collar or boss section 54 while engaging a bearing surface 55.

The angle X defined by the intersection of the rod 34 centerline and conical sidewall 52 is between 20° and 35° and preferably is 30°. Because of the relative sharpness of sealing angle X, valve 50 tends to be self-centering when being urged from its open position of FIG. 3 to its closed position of FIG. 2 by spring 53.

The arrows designated C in FIG. 3 represent combustion product flowing from the cylinder to the external surroundings, and, the arrows designated A in FIG. 2 represent external air flowing into chamber 49.

OPERATION

Keeping the above construction in mind it can be understood how the previously described disadvantages of conventional motorcycle compression releases are overcome or substantially eliminated by the present invention.

As the motorcycle is being maneuvered under normal traveling conditions the compression release structure 10 remains inactive as shown in FIG. 1 with spring 44 holding valve 36 closed and spring 53 holding check valve 50 closed.

If the driver suddenly finds it necessary to negotiate a sharp decline, rough irregular terrain or the like and therefore requires auxiliary braking action as he attempts to steady the motorcycle with both feet then he may swiftly operate the compression release structure 10 by manipulating the conveniently located handlebar lever.

Because of the customary linkage between the handlebar lever and the compression release arrangement 10, valve 36 will become opened to permit combustion product C and other gases to flow through valve 36 into tubular insert 26 where it lifts valve 50 (as shown in FIG. 3) against the resisting pressure of spring 53. Eventually the combustion product C is exhausted into the surrounding atmosphere through ports 22.

The diminished cylinder pressure instantly allows the driver to benefit from some predetermined degree of compression braking. The compression release structure may be regulated to diminish cylinder pressure to a level where the engine will shut off or some other low-compression level. When the return spring pressure of coil spring 53 overcomes the residual cylinder gas pressure it operates to plunge check valve 50 downwardly onto its conical valve seat 30. The tight sealing action between valve 50 and valve seat 30 prevents a stream of air, indicated by arrow A in FIG. 2, from passing through tubular insert 26 into the motorcycle cylinder. Therefore, the contaminants and other debris carried by the surrounding air A are prevented from entering the cylinder where fouling and erosion of the cylinder components would gradually occur.

From the foregoing it will be evident that the present invention has provided a motorcycle compression release in which all of the various advantages are fully realized.

What is claimed:

1. A compression release structure for use with a vehicle combustion cylinder, comprising:
    a. a housing having an upper end, a lower end, a bore extending between the upper and lower ends formed with an internally threaded portion, and, an internal shoulder;
    b. a tubular insert with external threads coupled to the housing bore threaded portion, the insert having a lower end projecting outwardly from the housing lower end and an upper end confined in the housing and spaced from the shoulder;
    c. a first valve seat defined by the insert lower end;
    d. a second valve seat of round configuration recessed in the insert upper end;
    e. an elongated rod extending through the housing and tubular insert, the rod having a lower end defining a first valve for mating with the first valve seat and an upper end projecting upwardly from the housing upper end;
    f. a retaining cap coupled to the elongated rod upper end;
    g. a first spring with opposing ends engaging the housing and retaining cap and whose biasing force operates to normally urge the first valve onto its seat;
    h. a second valve of round configuration that is self-centering and shaped to mate with the second valve seat, the second valve having a longitudinally extending bore surrounding the elongated rod; and,
    i. a second spring with opposing ends engaging the second valve and housing internal shoulder and whose biasing force operates to normally urge the second valve onto its seat, the second spring causing the second valve to act as a one-way check valve;

wherein when the compression release structure is incorporated in a vehicle combustion cylinder the first valve may be opened to admit compressed gases in one direction outward through the second valve and external air is prevented from flowing in the reverse direction through the second valve and into the cylinder.

2. The structure according to claim 1, wherein;
the second valve and second valve seat have complementary conical-shaped sidewalls.

3. The structure according to claim 2, wherein;
the angle defined by the second valve longitudinal centerline and its conical shaped side walls is between 20° and 35°.

4. The structure according to claim 3, wherein;
the angle defined by the second valve longitudinal center line and its conical-shaped sidewall is 30°.

5. The structure according to claim 2, wherein;
the second spring is a coil spring whose lower end fits around a boss portion of the second valve.

6. The structure according to claim 1, including:
a connecting pin extending through registering openings in the housing and insert to lock the housing and insert against relative motion.

7. The structure according to claim 1, including:
plural radially extending exhaust ports in the housing above the second valve seat through which compressed gases may be expelled.

8. The structure according to claim 1, including:
a first guide opening extending longitudinally through the retaining cap;
a second guide opening in the housing aligned in registering relationship with the first guide opening;
a cable aligned in the guide openings and arranged for use in operating the first valve; and
a tightening element positioned in the housing for inward motion to tightly lock the cable against the housing.

9. The structure according to claim 8, wherein;
the first spring is a coil spring surrounding cable segment extending between the retaining cap and housing.

10. A compression release structure for use in a motorcycle combustion cylinder, comprising:
a. a housing having an upper end, a lower end, a bore extending between the upper and lower ends and with an internally threaded portion, plural exhaust ports extending radially outwardly from the bore, and internal shoulder;
b. a tubular insert with external threads coupled to the housing bore threaded portion, the insert having a lower end projecting outwardly from the housing lower end and an upper end confined in the housing and spaced from the shoulder;
c. a first valve seat defined by the insert lower end;
d. a second valve seat of conical configuration recessed in the insert upper end;
e. an elongated rod extending through the housing and tubular insert, the rod having a lower end defining a first valve for mating with the first valve seat and an upper end projecting upwardly from the housing upper end.
f. a retaining cap coupled to the elongated rod upper end;
g. a first coil spring with opposing ends engaging the retaining cap and housing and whose biasing force operates to urge the first valve onto its seat;
h. a second valve that is self-centering and of conical configuration to mate with the second valve seat, the second valve having a longitudinally extending bore surrounding and sufficiently spaced from the elongated rod to facilitate self-centering action, wherein the angle defined by the second valve longitudinal centerline and its conical sidewall is between 20° and 35°;
i. a second coil spring with opposing ends engaging the housing internal shoulder and fitting over a boss portion of the second valve, the second spring-biasing force operating to normally urge the second valve onto its seat to cause the second valve to act as a one way check valve;
j. a connecting pin extending through registering openings in the housing and insert to lock the housing and insert against relative motion;
k. a first guide opening extending longitudinally through the retaining cap;
l. a second guide opening in the housing aligned in registering relationship with the first guide opening;
m. a cable aligned in the guide opening for use in operating the first valve; and,
n. a tightening element positioned in the housing for inward motion to tightly lock the cable against the housing,
wherein when the compression release structure is incorporated in a motorcycle cylinder the cable may be manipulated to open the first valve to admit compressed gases in one direction outwardly through the second valve and external air is prevented from flowing back in reverse direction through the second valve and into the cylinder because the second valve will automatically close before this can happen.

* * * * *